United States Patent
Tabuchi (10) Patent No.: US 12,395,043 B2
(45) Date of Patent: Aug. 19, 2025

(54) COOLING DEVICE FOR ELECTRIC MOTOR (71) Applicant: TOYOTA JIDOSHA KABUSHIKI KAISHA, Toyota (JP)

(72) Inventor: Kenta Tabuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/119,032

(22) Filed: Mar. 8, 2023

(65) Prior Publication Data

US 2023/0291280 A1 Sep. 14, 2023

(30) Foreign Application Priority Data

Mar. 11, 2022 (JP) ................... 2022-038437

(51) Int. Cl.
*H02K 9/19* (2006.01)
*H02K 9/193* (2006.01)

(52) U.S. Cl.
CPC .................... *H02K 9/193* (2013.01)

(58) Field of Classification Search
CPC ............ H02K 9/19; H02K 9/193; H02K 5/20; H02K 5/203; H02K 5/22
See application file for complete search history.

(56) References Cited

U.S. PATENT DOCUMENTS

| 2009/0184592 A1* | 7/2009 | Sano | H02K 9/19 |
| | | | 310/90 |
| 2010/0033040 A1* | 2/2010 | Wakita | H02K 9/19 |
| | | | 310/68 C |
| 2011/0156508 A1* | 6/2011 | Minemura | H02K 9/19 |
| | | | 310/54 |
| 2011/0156509 A1* | 6/2011 | Minemura | H02K 9/19 |
| | | | 310/54 |
| 2012/0062055 A1* | 3/2012 | Murakami | H02K 5/203 |
| | | | 310/54 |
| 2013/0038150 A1* | 2/2013 | Chamberlin | H02K 5/203 |
| | | | 310/59 |

(Continued)

FOREIGN PATENT DOCUMENTS

| JP | 2010-124657 A | 6/2010 |
| JP | 2012-65384 A | 3/2012 |

(Continued)

*Primary Examiner* — Oluseye Iwarere
*Assistant Examiner* — Masoud Vaziri
(74) *Attorney, Agent, or Firm* — Sughrue Mion, PLLC (57) ABSTRACT

A cooling device for an electric motor that includes a stator, a rotor and a shaft fixed in an inner circumferential surface of the rotor. The stator includes a stator core and a stator coil wound on the stator core. The stator coil includes a protruding portion which protrudes from the stator core and which constitutes a coil end. The cooling device includes (a) a refrigerant supply mechanism for supplying a refrigerant from an upper side of the electric motor and (b) a refrigerant guide protruding from a motor casing toward an inner peripheral side of the coil end. The refrigerant supply mechanism is configured to supply the refrigerant to the refrigerant guide. The refrigerant guide extends in a direction of a rotation axis of the electric motor to a position that overlaps with the coil end as seen from a radial direction of the electric motor.

6 Claims, 4 Drawing Sheets

(56) References Cited

U.S. PATENT DOCUMENTS

| | | | | |
|---|---|---|---|---|
| 2013/0038151 A1* | 2/2013 | Ohashi | ............... | H02K 7/086 |
| | | | | 310/59 |
| 2014/0346905 A1* | 11/2014 | Matsui | ............... | H02K 9/19 |
| | | | | 310/54 |
| 2021/0234422 A1* | 7/2021 | Takeno | ............... | B60K 11/02 |
| 2022/0037955 A1* | 2/2022 | Wang | ............... | H02K 9/193 |

FOREIGN PATENT DOCUMENTS

| JP | 2017-147878 A | 8/2017 |
|---|---|---|
| JP | 2019-140906 A | 8/2019 |
| JP | 6881692 B1 | 6/2021 |
| JP | 2021-125895 A | 8/2021 |

\* cited by examiner

COOLING DEVICE FOR ELECTRIC MOTOR

This application claims priority from Japanese Patent Application No. 2022-038437 filed on Mar. 11, 2022, the disclosure of which is herein incorporated by reference in its entirety.

FIELD OF THE INVENTION

The present invention relates to improvement of cooling performance of a cooling device for an electric motor.

BACKGROUND OF THE INVENTION

There are proposed various kinds of cooling devices for cooling electric motor. For example, JP 6881692 B1 discloses a structure for improving cooling performance for cooling an electric motor, wherein the structure includes a refrigerant guide member provided in a bracket of a casing, so as to make it possible to guide a refrigerant (coolant oil) to a lower portion of a coil end that is located on a lower side of a rotation axis of the electric motor, for appropriately supplying the refrigerant to the lower portion of the coil.

SUMMARY OF THE INVENTION

By the way, the refrigerant guide member disclosed in the above-identified Japanese Patent Publication is a member independent from the casing and attached to the casing, thereby increasing a number of required components. Further, there is a risk of leakage of the refrigerant through a gap between the refrigerant guide member and the casing. Therefore, since a preventive mechanism is required to prevent the leakage of the refrigerant through the gap between the refrigerant guide member and the casing, there is a room for improvement in efficient supply of the refrigerant to the lower portion of the coil end that is located on the lower side of the rotation axis of the electric motor.

The present invention was made in view of the background art described above. It is therefore an object of the present invention to provide a cooling device for an electric motor, wherein the cooling device is capable of improving cooling performance for cooling the electric motor by appropriately supplying a lower portion of a coil end of the electric motor.

The object indicated above is achieved according to the following aspects of the present invention.

According to a first aspect of the invention, there is provided a cooling device for an electric motor that includes: (i) a tubular stator, (ii) a tubular rotor disposed on an inner peripheral side of the stator; and (iii) a shaft fixed in an inner circumferential surface of the rotor, such that the stator includes a tubular stator core and a stator coil wound on the stator core, such that the stator coil includes a protruding portion which protrudes from the stator core and which constitutes a coil end, and such that the shaft is rotatably supported by a motor casing through a bearing. The cooling device includes: (a) a refrigerant supply mechanism configured to supply a refrigerant from an upper side of the electric motor in a vertical direction; and (b) a refrigerant guide protruding from the motor casing toward an inner peripheral side of the coil end. The refrigerant supply mechanism is configured to supply the refrigerant to the refrigerant guide that extends in a direction of a rotation axis of the electric motor to a position that overlaps with the coil end as seen from a radial direction of the electric motor. It is noted that the above-described "upper side of the electric motor in a vertical direction" may be defined also as "outer side of the electric motor in a radial direction of the electric motor".

According to a second aspect of the invention, in the cooling device according to the first aspect of the invention, the refrigerant supply mechanism has a refrigerant passage located on the upper side of the electric motor in the vertical direction, and a refrigerant release hole through which the refrigerant is released from the refrigerant passage, wherein the refrigerant release hole is provided in a position which does not overlap with the coil end and overlaps with a bearing holding portion holding the bearing as seen from the vertical direction, and wherein the refrigerant guide is configured to receive the refrigerant flowing down from the bearing holding portion. It is noted that the above-described "as seen from the vertical direction" may be defined also as "as seen from the radial direction".

According to a third aspect of the invention, in the cooling device according to the second aspect of the invention, the refrigerant supply mechanism has, in addition to the refrigerant release hole as a first refrigerant release hole, a second refrigerant release hole through which the refrigerant is released from the refrigerant passage, and the second refrigerant release hole is provided in a position which overlaps with the coil end as seen from the vertical direction.

According to a fourth aspect of the invention, in the cooling device according to any one of the first through third aspects of the invention, the refrigerant guide is disposed on an inner peripheral side of the coil end, and includes an arc portion extending along an inner periphery of the coil end, and the arc portion includes a portion that overlaps with a lowermost point of the coil end in the vertical direction, as seen from the vertical direction. It is noted that the above-described "lowermost point of the coil end in the vertical direction, as seen from the vertical direction" may be defined also as "most distant point of the coil end that is most distant from the refrigerant supply mechanism, as seen from the radial direction".

According to a fifth aspect of the invention, in the cooling device according to the fourth aspect of the invention, the refrigerant guide includes a rib provided in a position distant from a lowermost point of the arc portion in the vertical direction, by a predetermined distance in a circumferential direction of the arc portion, and the rib extends inwardly from an inner peripheral wall of the arc portion in the radial direction. It is noted that the above-described "lowermost point of the arc portion in the vertical direction" may be defined also as "most distant point of the arc portion that is most distant from the refrigerant supply mechanism".

According to a sixth aspect of the invention, in the cooling device according to the fifth aspect of the invention, the arc portion of the refrigerant guide is provided with a cutout located in a position which is adjacent to the rib and which is located between the rib and the lowermost point of the arc portion in the circumferential direction, and the cutout is constituted by a recess provided in an opposed surface of the arc portion that is opposed to the electric motor in the direction of the rotation axis.

According to a seventh aspect of the invention, in the cooling device according to the first aspect of the invention, the refrigerant guide is provided with a cutout located in a distal end portion thereof in the direction of the rotation axis.

According to an eighth aspect of the invention, in the cooling device according to the first aspect of the invention, the refrigerant supply mechanism is a coolant pipe which is disposed on the upper side of the electric motor in the vertical direction and which is provided with a refrigerant release hole through which the refrigerant is to be released.

In the cooling device according to the first aspect of the invention, the refrigerant supply mechanism is configured to supply the refrigerant to the refrigerant guide, and the refrigerant guide protrudes toward the inner peripheral side of the coil end, and extends in the direction of the rotation axis to the position that overlaps with the coil end as seen from the radial direction of the electric motor. Thus, the refrigerant supplied from the refrigerant supply mechanism to the refrigerant guide can be moved along the refrigerant guide and supplied to a lower portion of the coil end in the vertical direction. Consequently, the lower portion of the coil end can be efficiently cooled by the refrigerant, so that cooling performance of the cooling device is improved.

In the cooling device according to the second aspect of the invention, the refrigerant supply mechanism has the refrigerant release hole through which the refrigerant is released from the refrigerant passage, and the refrigerant release hole is provided in the position which does not overlap with the coil end and overlaps with the bearing holding portion holding the bearing, as seen from the vertical direction. The refrigerant released from the refrigerant release hole is supplied to the bearing holding portion, without being interfered by the coil end. Further, the refrigerant supplied to the bearing holding portion flows down along a circumferential wall of the bearing holding portion and is then received by the refrigerant guide. Consequently, the refrigerant released from the refrigerant release hole is supplied to the refrigerant guide without via the coil end.

In the cooling device according to the third aspect of the invention, the refrigerant supply mechanism has the second refrigerant release hole through which the refrigerant is released from the refrigerant passage, and the second refrigerant release hole is provided in the position which overlaps with the coil end as seen from the vertical direction. Thus, the refrigerant released from the second refrigerant release hole is supplied to an upper portion of the coil end in the vertical direction. Therefore, the upper portion of the coil end is appropriately cooled by the refrigerant released from the second refrigerant release hole.

In the cooling device according to the fourth aspect of the invention, the refrigerant guide includes the arc portion extending along the inner periphery of the coil end, and the arc portion includes the portion that overlaps with the lowermost point of the coil end in the vertical direction as seen from the vertical direction. Thus, the refrigerant dropping from above can be received by the arc portion having an arc shape.

In the cooling device according to the fifth aspect of the invention, the refrigerant guide includes the rib provided in the position distant from the lowermost point of the arc portion in the vertical direction, by the predetermined distance in the circumferential direction of the arc portion, and the rib extends inwardly from an inner circumferential wall of the arc portion in the radial direction. Thus, the refrigerant moved downwardly along the inner circumferential wall of the arc portion collides with the rib, and then the refrigerant is moved in the direction of the rotation axis of the electric motor. Further, the refrigerant moved in the direction of the rotation axis to a distal end of the refrigerant guide drops from the distal end of the refrigerant guide toward the coil end. Consequently, since the refrigerant can be supplied to a portion of the coil end that is located on an upper side of the lowermost point of the coil end in the vertical direction, it is possible to cool a wide region of the coil end.

In the cooling device according to the sixth aspect of the invention, the arc portion of the refrigerant guide is provided with the cutout located in the position which is adjacent to the rib and which is located between the rib and the lowermost point of the arc portion in the circumferential direction, and the cutout is constituted by the recess provided in the opposed surface of the arc portion that is opposed to the electric motor in the direction of the rotation axis. Thus, even when the refrigerant, which has collided with the rib and moved in the direction of the rotation axis, passes over a distal end of the rib, the refrigerant can be forcedly caused to drop through a space defined by the cutout of the arc portion.

In the cooling device according to the seventh aspect of the invention, the refrigerant guide is provided with the cutout located in the distal end portion thereof in the direction of the rotation axis. Thus, the distal end portion of the refrigerant guide, which has a continuously curved shape after a casting, is shaped, by the cutout, to have a discontinuous shape, so that it is possible to suppress the refrigerant from passing over the distal end of the refrigerant guide. Consequently, the refrigerant is efficiently caused to drop from the distal end of the refrigerant guide, so as to be appropriately supplied to the coil end.

In the cooling device according to the eighth aspect of the invention, the refrigerant can be supplied to the refrigerant guide from the refrigerant release hole of the coolant pipe that is disposed on the upper side of the electric motor in the vertical direction.

DETAILED DESCRIPTION OF PREFERRED EMBODIMENT

There will be described embodiment of the present invention in details with reference to drawings. It is noted that figures of the drawings are simplified or deformed as needed, and each portion is not necessarily precisely depicted in terms of dimension ratio, shape, etc., for easier understanding of the embodiment.

Embodiment

Figure 1:
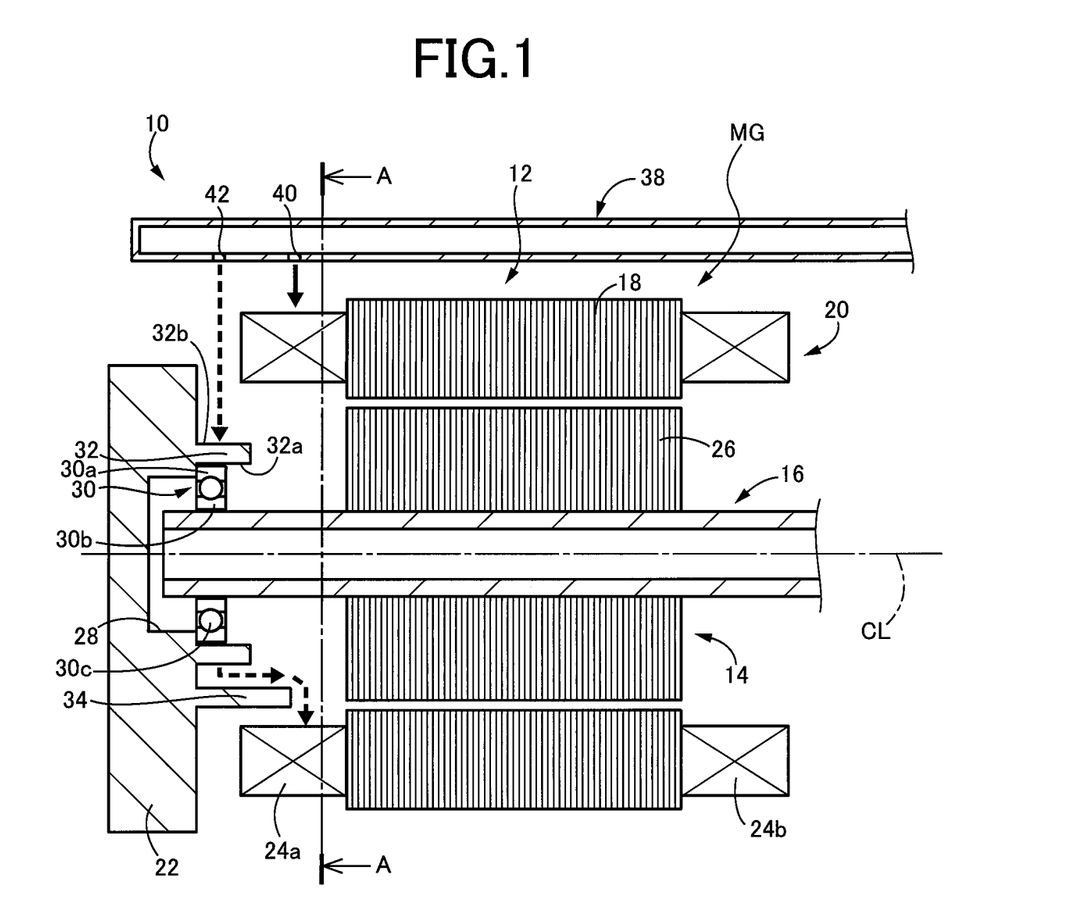
FIG. 1 is a cross sectional view schematically showing an electric motor and a cooling device for cooling the electric motor.

FIG. 1 is a cross sectional view schematically showing a horizontal-type electric motor MG and a cooling device 10 for cooling the electric motor MG, wherein the cooling device 10 is constructed according to an embodiment of the present invention. The electric motor MG is to be used as, for example, a drive power source to be provided in a vehicle so as to drive the vehicle. The electric motor MG is to be disposed such that its horizontal axis CL (i.e., center line) extends in a horizontal direction. In the following description, the term "assembled state" means a state in which the cooling device 10 is fixed relative to the electric motor MG on a horizontal plane. Therefore, in FIG. 1 showing the assembled state, an upward direction in the drawing sheet corresponds to an upward direction of an assembly of the cooling device 10 and the electric motor MG. The following description assumes that the assembled state is established on the horizontal plane.

The electric motor MG includes a cylindrical tubular stator 12 as a non-rotary member, a cylindrical tubular rotor 14 disposed on an inner peripheral side of the stator 12, and a rotor shaft 16 fixed in an inner circumferential surface of the rotor 14. It is noted that the rotor shaft 16 corresponds to "shaft" recited in the appended claims.

The stator 12 includes a stator core 18 formed to have a cylindrical tubular shape and a stator coil 20 wound on the stator core 18.

The stator core 18 is constituted by a plurality of insulated electromagnetic steel plates that are laminated in the direction of the rotation axis CL. The stator core 18 is unrotatably fixed to a motor casing 22 through screw bolts (not shown). The stator core 18 has a plurality of slots (not shown) that are spaces extending outwardly from an inner circumferential surface of the stator core 18 in a radial direction of the stator core 18. The slots are arranged at equal angular intervals in a circumferential direction of the stator core 18, and extend through the stator core 18 in the direction of the rotation axis CL. The stator coil 20 is provided to pass through each of the slots in the direction of the rotation axis CL. A pair of coil ends 24a, 24b are constituted by protruding portions of the stator coils 20, which protrude from the stator core 18 in the direction of the rotation axis CL. Each of the coil ends 24a, 24b has an annular shape and extends in a circumferential direction of the stator core 18.

The rotor 14 includes a rotor core 26 that is formed to have a cylindrical tubular shape. The rotor core 26 is constituted by a plurality of insulated electromagnetic steel plates that are laminated in the direction of the rotation axis CL. The rotor shaft 16 is integrally fixed in an inner circumferential surface of the rotor core 26. The rotor shaft 16 is formed to have a cylindrical tubular shape, and supported to be rotatable about the rotation axis CL. The rotor shaft 16 is received at each of end portions that are opposite to each other in the direction of the rotation axis CL, in a receiving hole 28 that is provided in the motor casing 22, and is rotatably supported by the motor casing 22 through a bearing 30.

The bearing 30 is held by a cylindrical-tubular-shaped tubular bearing holding portion 32 that extends in the direction of the rotation axis CL, from a perpendicular wall surface of the motor casing 22 perpendicular to the rotation axis CL, toward the electric motor MG. Specifically, an outer race 30a of the bearing 30 is fitted in an inner circumferential surface 32a of the bearing holding portion 32, for example, with an interference fit.

There will be described the cooling device 10 for cooling the coil end 24a of the electric motor MG, by supplying a refrigerant in the form of oil to the coil end 24a of the electric motor MG. The cooling device 10 includes a coolant pipe 38 for supplying the oil from an upper side of the electric motor MG and an oil guide 34 for guiding the oil released from the coolant pipe 38, to a lower portion of the coil end 24a that is located on a lower side of the rotation axis CL in a vertical direction. The oil guide 34 is formed integrally with the motor casing 22 by aluminum casting.

The coolant pipe 38 is disposed on the upper side of the electric motor MG, such that the coolant pipe 38 extends in parallel to the rotation axis CL of the electric motor MG, namely, a longitudinal direction of the coolant pipe 38 corresponds to the direction of the rotation axis CL. The oil, which is scooped up by an oil pump (not shown), is supplied to the coolant pipe 38. The coolant pipe 38 is provided with first and second oil release holes 40, 42, through which the oil flowing in the coolant pipe 38 is to be released. Thus, the oil supplied to the coolant pipe 38 is supplied downwardly in the vertical direction from the first and second oil release holes 40, 42. The first oil release holes 40 are located in a position that enables the oil released from the first oil release holes 40 to be supplied to an upper portion of the coil end 24a which is located on an upper side of the rotation axis CL in the vertical direction. The second oil release hole 42 is located in a position that enables the oil released from the second oil release hole 42 to be supplied to the oil guide 34. It is noted that the coolant pipe 38 defines "refrigerant passage" recited in the appended claims, and that the coolant pipe 38 and the first and second release holes 40, 42 cooperate to constitute "refrigerant supply mechanism" recited in the appended claims.

The oil guide 34 protrudes in the direction of the rotation axis CL, from the perpendicular wall surface of the motor casing 22 perpendicular to the rotation axis CL, toward an inner peripheral side of the coil end 24a. The oil guide 34 is disposed on the inner peripheral side of the coil end 24a as seen from the direction of the rotation axis CL. Further, the oil guide 34 is formed to cover an outer periphery of a lower portion of the bearing holding portion 32 that is located on the lower side of the rotation axis CL in the vertical direction, such that the oil dropping from the bearing holding portion 32 is received by the oil guide 34. It is noted that the oil guide 34 corresponds to "refrigerant guide" recited in the appended claims.

Figure 2:
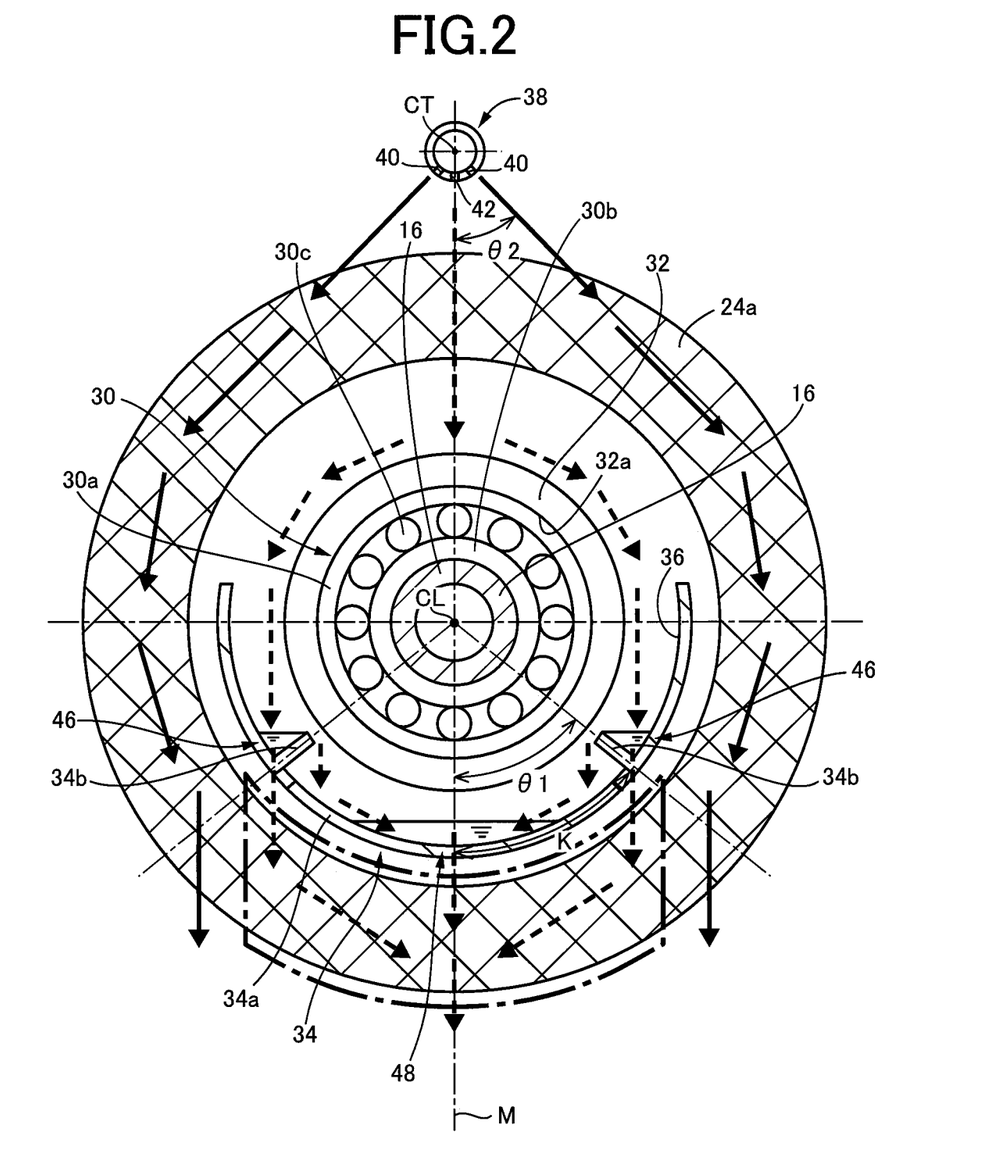
FIG. 2 is a cross sectional view taken in line A-A shown in FIG. 1.

The oil guide 34 extends in the direction of the rotation axis CL to a position that overlaps with the coil end 24a as seen from a radial direction of the electric motor MG. FIG. 2 is a cross sectional view taken in line A-A shown in FIG. 1. In FIG. 2, an upward direction in the drawing sheet corresponds to the upward direction of an assembly of the cooling device 10 and the electric motor MG. Further, in FIG. 2, hatched part represents a cross section of the coil end 24a, which is perpendicular to the rotation axis CL. As shown in FIG. 2, the rotor shaft 16, the bearing 30 and the bearing holding portion 32 are arranged sequentially in the radial direction away from the rotation axis CL toward an outer periphery of the coil end 24a.

The bearing 30 includes the above-described outer race 30a that is fitted in the inner circumferential surface 32a of the bearing holding portion 32, an inner race 30b that is fitted on the outer circumferential surface of the rotor shaft 16, and a plurality of balls 30c interposed between the outer and inner races 30a, 30b.

The oil guide 34 is located on a lower side of the cylindrical-tubular-shaped bearing holding portion 32. The oil guide 34 is located between the bearing holding portion 32 and the coil end 24a in the radial direction orthogonal to the rotation axis CL.

The oil guide 34 includes an arc portion 34a having a predetermined thickness as seen from the direction of the rotation axis CL, as shown in FIG. 2, and formed to have an arc shape (or semicircular shape) whose center corresponds to the rotation axis CL. The oil guide 34 further includes a pair of ribs 34b extending from an inner circumferential wall 36 of the arc portion 34a inwardly in the radial direction.

The arc portion 34a having the predetermined thickness and the arc shape extends along an inner periphery of the coil end 24a. The arc shape of the arc portion 34a is continuous throughout an entirety of the arc portion 34a from a circumferentially end of the arc portion 34a to another circumferentially end of the arc portion 34a. In the present embodiment, the arc portion 34a has a central angle that is slightly larger than 180 degrees, namely, the arc shape is larger than the semicircular shape by a predetermined circumferential length.

The arc portion 34a includes a lower portion located on the lower side of the rotation axis CL in the vertical direction, and the lower portion of the arc portion 34a is formed to have the arc shape extending along the inner periphery of the coil end 24a. The arc portion 34a further includes a pair of upper portions located on the upper side of the rotation axis CL in the vertical direction, and each of the upper portions of the arc portion 34a is also formed to have the arc shape extending along the inner periphery of the coil end 24a. Each of the upper portions of the arc portion 34a circumferentially extends from a corresponding one of circumferentially opposite ends of the lower portion of the arc portion 34 by a predetermined circumferential distance. Thus, the arc portion 34a having the arc shape extending along the inner periphery of the coil end 24a includes at least a portion that overlaps with a lowermost point of the coil end 24a as seen from the vertical direction. Further, the arc shape of the arc portion 34a is shaped to cover an outer periphery of a lower portion of the bearing holding portion 32 located on the lower side of the rotation axis CL, so that the oil dropping from an outer circumferential wall surface of the bearing holding portion 32 can be received by the arc portion 34a.

The pair of ribs 34b are formed to be symmetrical with each other with respect to a straight line M that passes through the rotation axis CL and an axis (i.e., center) CT of the coolant pipe 38. Each of the ribs 34b is located in a position distant from a lowermost point of the arc portion 34a in the vertical direction, by a predetermined distance K in a circumferential direction of the arc portion 34a, or in position offset from the lowermost point as a reference (or zero) point of the arc portion 34a by a predetermined angle θ1 in the circumferential direction. Thus, each of the ribs 34b is located in the position which is distant from the straight line M passing through the rotation axis CL and the axis CT of the coolant pipe 38, and which is located on an upper side of the lowermost point of the arc portion 34a in the vertical direction.

Each of the ribs 34b extends inwardly from the inner circumferential wall 36 of the arc portion 34a toward the rotation axis CL in the radial direction. Owing to provision of each of the ribs 34b, a first oil reservoir 46 is defined between the arc portion 34a and each of the ribs 34b, for temporarily reserve the oil therein.

Figure 3:
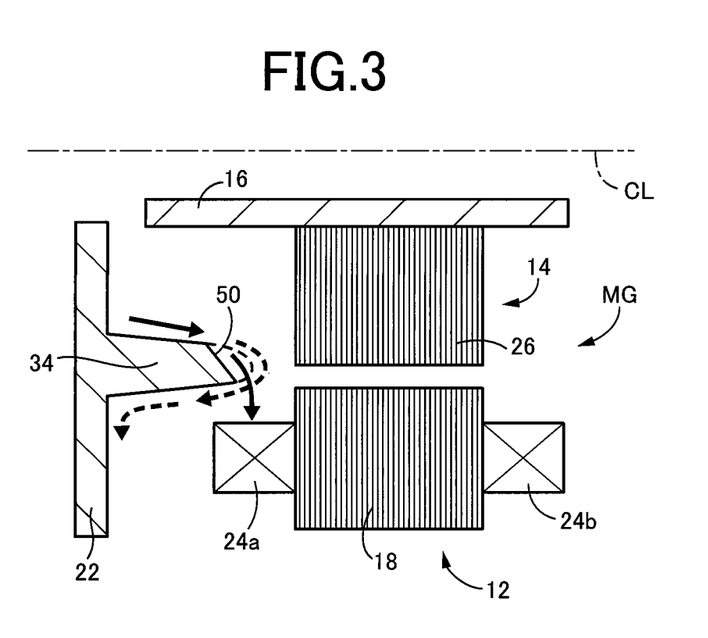
FIG. 3 is a view for explaining effect provided by provision of a cutout in a distal end portion of an oil guide in a direction of a rotation axis of an electric motor.

The oil guide 34 is provided with a cutout 50 located in its distal end portion in the direction of the rotation axis CL (see FIG. 3). FIG. 3 is a view for explaining effect provided by provision of the cutout 50 in the distal end portion of the oil guide 34 in the direction of the rotation axis CL. It is noted that, in FIG. 3, components or parts such as the electric motor MG and the oil guide 34 are illustrated in a simplified manner, and dimension ratio is different from in reality. Further, for example, the bearing 30 and the bearing holding portion 32 are not illustrated in FIG. 3. It is noted that the cutout 50 corresponds to "cutout" recited in the appended claims.

The motor casing 22 and the oil guide 34 are formed integrally with each other by aluminum casting. Therefore, the oil guide 34 is formed to have a slope that allows a mould or moulds to be withdrawn in process of the casting. After the casting, the distal end portion of the oil guide 34 has a continuously curved shape as indicated by broken line in FIG. 3. If the oil were supplied to the oil guide 34 in this state in which the distal end portion of the oil guide 34 has the curved shape, the oil would be likely to pass over a distal end of the oil guide 34 and flow downwardly. Consequently, the oil would be moved downwardly from the distal end portion of the oil guide 34, along the oil guide 34, as indicated by arrows of broken lines in FIG. 3, so that the oil would be unlikely to drop from the distal end of the oil guide 34. For preventing such a movement of the oil, the cutout 50 is provided in the distal end portion of the oil guide 34.

With the cutout 50 being provided in the distal end portion of the oil guide 34, the above-described continuously curved shape of the distal end portion of the oil guide 34 is cut so as to be changed to a discontinuous shape, so that the oil is likely to drop from the distal end of the oil guide 34 as indicated by arrows of solid lines. It is preferable that the cutout 50 is provided in only a portion (e.g., circumferentially intermediate portion) of the arc portion 34a in which the oil is to drop from the distal end of the oil guide 34. However, the cutout 50 may be provided in an entirety of the arc portion 34a, so as to extend throughout the arc portion 34a in the circumferential direction.

Figure 4:
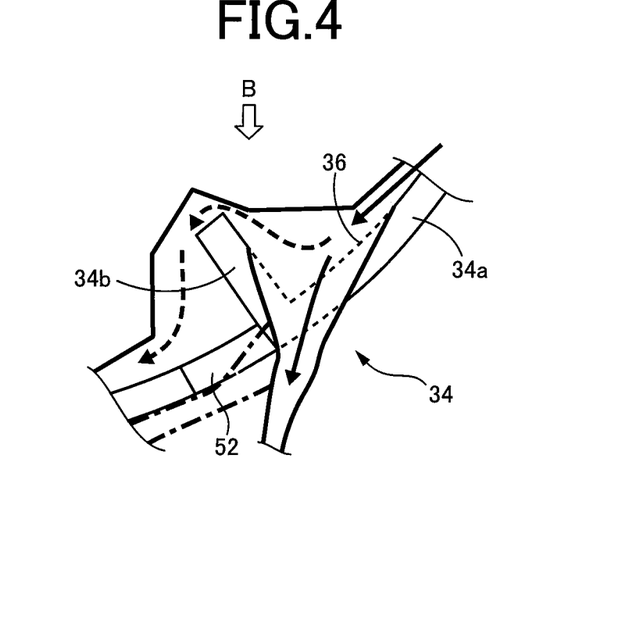
FIG. 4 is a partial view of FIG. 2 showing, in enlargement, a rib provided in an arc portion of the oil guide.
Figure 5:
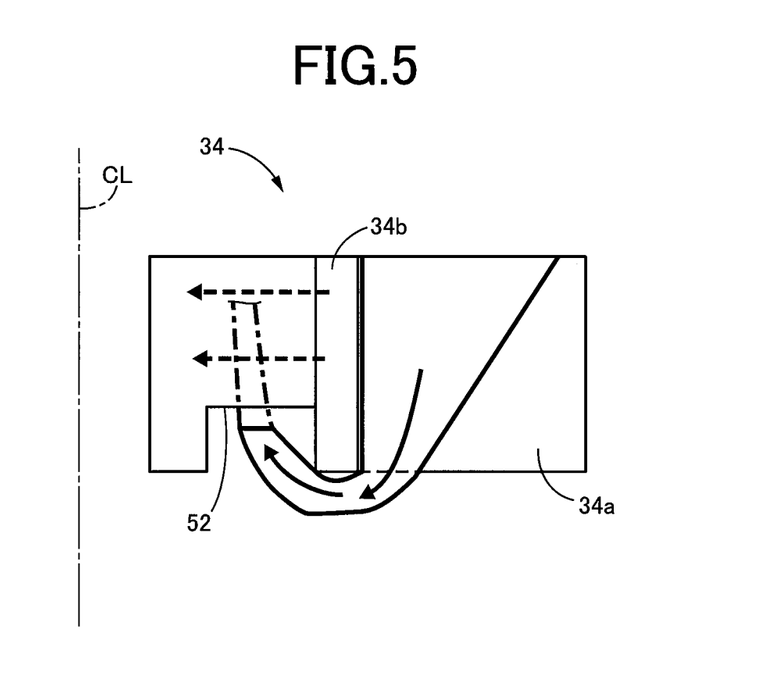
FIG. 5 is a view as seen from a direction of arrow B shown in FIG. 4.

Further, the arc portion 34a of the oil guide 34 is provided with a cutout 52 located in a position that is adjacent to each of the ribs 34b in the circumferential direction. FIG. 4 is a partial view of FIG. 2 showing, in enlargement, one of the ribs 34b provided in the arc portion 34a of the oil guide 34. FIG. 5 is a view as seen from a direction of arrow B shown in FIG. 4, namely, as seen from above in the vertical direction. It is noted that, in FIGS. 4 and 5, all arrows indicate flow of the oil.

As shown in FIG. 4, the cutout 52 is located in the position which is adjacent to each of the ribs 34b in the circumferential direction, and which is located between each of the ribs 34b and the lowermost point of the arc portion 34a in the circumferential direction. The cutout 52 is constituted by a recess provided in an opposed surface of the arc portion 34a that is opposed to the electric motor MG in the direction of the rotation axis CL. It is noted the cutout 52 corresponds to "cutout" recited in the appended claims.

When the oil flowing down along the inner circumferential wall 36 of the arc portion 34a collides with the ribs 34b, the oil is moved in the direction of the rotation axis CL. There is a risk that the oil having been moved to the distal end of the arc portion 34a in the direction of the rotation axis CL would pass over a distal end of each of the ribs 34b without dropping from the distal end of the arc portion 34a, due to viscosity of the oil. However, in the present embodiment, owing to provision of the cutout 52, even when the oil passes over the distal end of each rib 34b in the direction of the rotation axis CL, the oil is forcedly caused to drop through a space defined by the cutout 52. Consequently, the oil having reached the distal end of the arc portion 34a in the direction of the rotation axis CL drops from the distal end of the arc portion 34a whereby the oil is appropriately supplied to the oil end 24a. It is noted that a part of the oil having reached the first oil reservoir 46 passes over the distal end of each rib 34 and is moved downwardly, as indicated arrows of broken lines.

In FIGS. 4 and 5, one-dot chain lines indicate flow of the oil in an arrangement in which the cutout 52 is not provided. In such an arrangement without the cutout 52, the oil having passed over the distal end of each rib 34 in the direction of the rotation axis CL would not drop from the distal end of the arc portion 34a in the direction of the rotation axis CL but would be moved downwardly along an outer circumferential wall surface of the arc portion 34a.

There will be described flow of the oil caused by the cooling device 10. As shown in FIGS. 1 and 2, arrows of solid lines indicate flow of the oil released from the first oil release holes 40. The first oil release holes 40 are provided in respective positions that overlap with the coil end 24a in the direction of the rotation axis CL as seen from the vertical direction. Further, each of the first oil release holes 40 is located in the position offset from a lowermost point as a reference (or zero) point of the coolant pipe 38 by a predetermined angle θ2 in a circumferential direction of the coolant pipe 38, as shown in FIG. 2. In the present embodiment, the first oil release holes 40 consist of two first oil release holes 40 that are located in the respective positions that are symmetrical with each other with respect to the above-described straight line M. It is noted that each of the first oil release holes 40 corresponds to "second refrigerant release hole" recited in the appended claims.

The oil released from the first oil release holes 40 is supplied to the upper portion of the coil end 24a located on the upper side of the rotation axis CL in the vertical direction in an assembles state in which the cooling device 10 is fixed relative to the electric motor MG, so as to cool mainly the upper portion of the coil end 24a. The oil supplied to the upper portion of the coil end 24a cools the upper portion of the coil end 24a and is moved downwardly along the coil end 24a.

In FIGS. 1 and 2, arrows of broken lines indicate flow of the oil released from the second oil release hole 42. The second oil release hole 42 is provided in a position that does not overlap with the coil end 24a but overlaps with the bearing holding portion 32 holding the bearing 30, in the direction of the rotation axis CL as seen from the vertical direction. Further, the second oil release holes 42 is located in the position corresponding to the lowermost point of the coolant pipe 38. Therefore, the oil released from the second oil release hole 42 is moved downwardly, without being supplied to the coil end 24a, so that the oil released from the second oil release hole 42 reaches an outer circumferential wall 32b of the bearing holding portion 32. It is noted that the second oil release hole 42 corresponds "refrigerant release hole" and "first refrigerant release hole" recited in the appended claims.

The oil having arrived the outer circumferential wall 32b of the bearing holding portion 32 is moved downwardly along the outer circumferential wall 32b. Further, when the oil has been moved onto the lower side of the rotation axis CL, the oil drops toward the oil guide 34, owing to gravity. The oil dropping from the outer circumferential wall 32b is moved downwardly along the inner circumferential wall 36 of the arc portion 34a, and collides with the ribs 34b.

The oil having collided with each of the ribs 34b is moved toward the distal end of the arc portion 34a (oil guide 34) in the direction of the rotation axis CL and then drops from the distal end of the arc portion 34a toward the inner periphery of the coil end 24a. Consequently, the oil is supplied to portions of the coil end 24a that are located below the respective ribs 34b in the vertical direction, and is moved from the portions of the coil end 24a downwardly along the coil end 24a, whereby a region of the coil end 24a indicated by one-dot chain line in FIG. 2 is cooled. This region of the coil end 24a indicated by the one-dot chain line is a region that is difficult to be cooled sufficiently by the oil flowing down along the upper portion of the coil end 24a. The above-described predetermined distance K and predetermined angle θ1, by which the position of each rib 34b is circumferentially distant from the lowermost point of the arc portion 34a in the vertical direction, is obtained by experimentation or determined by an appropriate design theory, such that the oil is supplied to the above-described region of the coil end 24a indicated by the one-dot chain line.

Since the cutout 50 is provided in the distal end portion of the oil guide 34 in the direction of the rotation axis CL, as shown in FIG. 3, the oil is reliably caused to drop from the distal end of the oil guide 34. Further, since the cutout 52 is provided in the position adjacent to each rib 34b in the circumferential direction, it is possible to suppress the oil having been moved to the distal end portion of the oil guide 34 in the direction of the rotation axis CL, from passing over the distal end of each rib 34b in the direction of the rotation axis CL and being moved toward the outer circumferential wall of the arc portion 34a.

Further, a part of the oil having collided with each rib 34b is moved from the first oil reservoir 46 defined by the arc portion 34a and each rib 34b to a distal end of each rib 34 in the radial direction, and then passes over the distal end of each rib 34 in the radial direction so as to be moved downwardly along the inner circumferential wall 36 of the arc portion 34a. The oil having been moved downwardly along the inner circumferential wall 36 of the arc portion 34a is temporarily reserved in a second oil reservoir 48 that is defined by a lowermost portion of the arc portion 34a in the vertical direction. The oil having reached the second oil reservoir 48 is moved in the direction of the rotation axis CL and is supplied from the distal end of the arc portion 34a in the direction of the rotation axis CL to a lowermost portion of the coil end 24a in the vertical direction.

Thus, the oil released from the second oil release hole 42 is supplied to the region of the coil end 24a indicated by the one-dot chain line in FIG. 2, via the bearing holding portion 32 and the arc portion 34a and the ribs 34b of the oil guide 34. Therefore, the lower portion of the coil end 24a, which is located on the lower side of the rotation axis CL in the vertical direction, is appropriately cooled by the oil. Meanwhile, the oil released from the first oil release holes 40 is supplied to the upper portion of the coil end 24a, which is located on the upper side of the rotation axis CL in the vertical direction, whereby the upper portion of the coil end 24a is appropriately cooled by the oil. Consequently, both of the upper and lower portions of the coil end 24a are appropriately cooled by the oil released from the coolant pipe 38.

Thus, the cooled oil is supplied to the lower portion of the coil end 24a, so that a temperature difference between the coil end 24a and the oil is made large whereby a heat transfer coefficient is increased. Further, since it is possible to increase an area of the coil end 24a with which the oil can be brought into contact, the temperature of the lower portion of the coil end 24a can be efficiently reduced. In connection with the efficient reduction of the temperature of the coil end 24a, it becomes possible to increase an electric current applied to the electric motor MG, thereby making it possible to reduce a size of the electric motor MG. Therefore, it is possible to reduce an amount of material used to manufacture the electric motor MG. In addition, restrictions on a rated output of the electric motor MG dependent on the temperature increase of the coil end 24a are relaxed, enabling further improvements in acceleration performance. Moreover, the reduction of the temperature of the coil end 24a leads to reduction of copper loss, thereby resulting in improvement of fuel efficiency.

As described above, in the present embodiment, the cooling device 10 is constructed such that the oil released from the second oil release hole 42 of the coolant pipe 38 can be supplied to the oil guide 34, and the oil guide 34 protrudes toward the inner peripheral side of the coil end 24a and extends in the direction of the rotation axis CL to the position that overlaps with the coil end 24a as seen from the radial direction of the electric motor MG. Thus, the oil supplied from the second oil release hole 42 of the coolant pipe 38 to the oil guide 34 can be moved along the oil guide 34 and supplied to the lower portion of the coil end 24a in the vertical direction. Consequently, the lower portion of the coil end 24a can be efficiently cooled by the oil, so that the cooling performance of the cooling device 10 is improved. Further, since the oil guide 34 is formed integrally with the motor casing 22, it is possible to prevent leakage of the oil through a gap between In the present embodiment, the coolant pipe 38 is provided with the second oil release hole 42 through which the oil is released from the coolant pipe 38, and the second oil release hole 42 is provided in the position which does not overlap with the coil end 24a and overlaps with the bearing holding portion 32 holding the bearing 30, as seen from the vertical direction. The oil released from the second oil release hole 42 is supplied to the bearing holding portion 32, without being interfered by the coil end 24a. Further, the oil supplied to the bearing holding portion 32 flows down along the circumferential wall of the bearing holding portion 32 and is then received by the oil guide 34. Consequently, the oil released from the second oil release hole 42 is supplied to the oil guide 34 without via the coil end 24a.

In the present embodiment, the coolant pipe 38 has the first oil release holes 40 through which the oil is released from the coolant pipe 38, and each of the first oil release holes 40 is provided in the position which overlaps with the coil end 24a as seen from the vertical direction. Thus, the oil released from the first oil release holes 40 is supplied to the upper portion of the coil end 24a in the vertical direction. Therefore, the upper portion of the coil end 24a is appropriately cooled by the oil released from the first oil release holes 40.

In the present embodiment, the oil guide 34 includes the arc portion 34a extending along the inner periphery of the coil end 24a, and the arc portion 34a includes the portion that overlaps with the lowermost point of the coil end 24a in the vertical direction as seen from the vertical direction. Thus, the oil dropping from the bearing holding portion 32 can be received by the arc portion 34a having the arc shape.

In the present embodiment, the oil guide 34 includes the ribs 34b each provided in the position distant from the lowermost point of the arc portion 34a in the vertical direction, by the predetermined distance K in the circumferential direction of the arc portion 34a, and each of the ribs 34b extends inwardly from the inner circumferential wall 36 of the arc portion 34a in the radial direction. Thus, the oil moved downwardly along the inner circumferential wall 36 of the arc portion 34a collides with the ribs 34b, and then the oil is moved in the direction of the rotation axis CL of the electric motor MG. Further, the oil moved in the direction of the rotation axis CL to the distal end of the oil guide 34 drops from the distal end of the oil guide 34 toward the coil end 24a. Consequently, since the oil can be supplied to a portion of the coil end 24a that is located on an upper side of the lowermost point of the coil end 24a in the vertical direction, it is possible to cool a wide region of the coil end 24a.

In the present embodiment, the arc portion 34a of the oil guide 34 is provided with the cutout 52 located in the position which is adjacent to each rib 34b and which is located between each rib 34b and the lowermost point of the arc portion 34a in the circumferential direction of the arc portion 34a, and the cutout 52 is constituted by the recess provided in the opposed surface of the arc portion 34a that is opposed to the electric motor MG in the direction of the rotation axis CL. Thus, even when the oil, which has collided with each rib 34b and moved in the direction of the rotation axis CL, passes over the distal end of each rib 34b, the oil can be forcedly caused to drop through the space defined by the cutout 52 of the arc portion 34a.

In the present embodiment, the oil guide 34 is provided with the cutout 50 located in the distal end portion thereof in the direction of the rotation axis CL. Thus, the distal end portion of the oil guide 34, which has the continuously curved shape after the casting, is shaped, by the cutout 50, to have the discontinuous shape, so that it is possible to suppress the oil from passing over the distal end of the oil guide 34. Consequently, the oil is efficiently caused to drop from the distal end of the oil guide 34, so as to be appropriately supplied to the coil end 24a.

While the preferred embodiment of this invention has been described in detail by reference to the drawings, it is to be understood that the invention may be otherwise embodied.

For example, in the above-described embodiment, the oil guide 34 is symmetrical with respect to the straight line M passing through the coolant pipe 38 and the rotation axis CL. However, the oil guide 34 may be asymmetrical with respect to the straight line M In the above-described embodiment, the arc portion 34a of the oil guide 34 has an arc length larger than that of a semicircle. However, this is not essential. Specifically, the arc length of the arc portion 34a may be shorter than that of the semicircle, namely, the central angle of the arc portion 34a may be smaller than 180 degrees.

In the above-described embodiment, the oil is released from the coolant pipe 38 that is disposed on the upper side of the electric motor MG in the vertical direction. However, this arrangement is not essential. For example, the oil may be released from an oil passage which is defined in an oil casing and which is located on the upper side of the electric motor MG. In short, the present invention is applicable to any arrangement in which the oil is supplied from the upper side of the electric motor MG.

In the above-described embodiment, the cooling device 10 is configured to cool the coil end 24a as one of the coil ends 24a, 24b that are located in respective opposite sides of the stator core 18 of the electric motor MG in the direction of the rotation axis CL. However, the cooling device 10 may be configured to cool the coil end 24b as well as the coil end 24a.

It is to be understood that the embodiment described above is given for illustrative purpose only, and that the present invention may be embodied with various modifications and improvements which may occur to those skilled in the art.

NOMENCLATURE OF ELEMENTS

10: cooling device
12: stator
14: rotor
16: rotor shaft (shaft)
18: stator core
20: stator coil
22: motor casing
24a, 24b: coil end
30: bearing
32: bearing holding portion
34: oil guide (refrigerant guide)

34a: arc portion
34b: rib
36: inner circumferential wall
38: coolant pipe (refrigerant passage, refrigerant supply mechanism)
40: first oil release hole (second refrigerant release hole)
42: second oil release hole (refrigerant release hole, first refrigerant release hole)
50: cutout
52: cutout
MG: electric motor

What is claimed is:

1. A cooling device for an electric motor that includes: (i) a tubular stator, (ii) a tubular rotor disposed on an inner peripheral side of the stator; and (iii) a shaft fixed in an inner circumferential surface of the rotor, such that the stator includes a tubular stator core and a stator coil wound on the stator core, such that the stator coil includes a protruding portion which protrudes from the stator core and which constitutes a coil end, and such that the shaft is rotatably supported by a motor casing through a bearing,
the cooling device comprising:
a refrigerant supply mechanism configured to supply a refrigerant from an upper side of the electric motor in a vertical direction; and
a refrigerant guide protruding from the motor casing toward an inner peripheral side of the coil end,
wherein the refrigerant supply mechanism is configured to supply the refrigerant to the refrigerant guide,
wherein the refrigerant guide extends in a direction of a rotation axis of the electric motor to a position that overlaps with the coil end as seen from a radial direction of the electric motor,
wherein the refrigerant guide is disposed on an inner peripheral side of the coil end, and includes an arc portion extending along an inner periphery of the coil end,
wherein the arc portion includes a portion that overlaps with a lowermost point of the coil end in the vertical direction, as seen from the vertical direction,
wherein the refrigerant guide includes a rib provided in a position distant from a lowermost point of the arc portion in the vertical direction, by a predetermined distance in a circumferential direction of the arc portion, and
wherein the rib extends inwardly from an inner peripheral wall of the arc portion in the radial direction.

2. The cooling device according to claim 1,
wherein the refrigerant supply mechanism has a refrigerant passage located on the upper side of the electric motor in the vertical direction, and a refrigerant release hole through which the refrigerant is released from the refrigerant passage,
wherein the refrigerant release hole is provided in a position which does not overlap with the coil end and overlaps with a bearing holding portion holding the bearing as seen from the vertical direction, and
wherein the refrigerant guide is configured to receive the refrigerant flowing down from the bearing holding portion.

3. The cooling device according to claim 2,
wherein the refrigerant supply mechanism has, in addition to the refrigerant release hole as a first refrigerant release hole, a second refrigerant release hole through which the refrigerant is released from the refrigerant passage, and
wherein the second refrigerant release hole is provided in a position which overlaps with the coil end as seen from the vertical direction.

4. The cooling device according to claim 1,
wherein the arc portion of the refrigerant guide is provided with a cutout located in a position which is adjacent to the rib and which is located between the rib and the lowermost point of the arc portion in the circumferential direction, and
wherein the cutout is constituted by a recess provided in an opposed surface of the arc portion that is opposed to the electric motor in the direction of the rotation axis.

5. The cooling device according to claim 1,
wherein the refrigerant guide is provided with a cutout located in a distal end portion thereof in the direction of the rotation axis.

6. The cooling device according to claim 1,
wherein the refrigerant supply mechanism is a coolant pipe which is disposed on the upper side of the electric motor in the vertical direction and which is provided with a refrigerant release hole through which the refrigerant is to be released.

* * * * *